United States Patent [19]

Chrisler

[11] Patent Number: 4,907,536
[45] Date of Patent: Mar. 13, 1990

[54] ISOLATING CONTAINER FOR LIVE ANIMALS

[76] Inventor: Tanner S. Chrisler, 5044 Westminster, St. Louis, Mo. 63108

[21] Appl. No.: 145,131

[22] Filed: Jan. 19, 1988

Related U.S. Application Data

[63] Continuation-in-part of Ser. No. 21,221, Mar. 3, 1987.

[51] Int. Cl.[4] .............................................. A01K 1/00
[52] U.S. Cl. ..................................................... 119/15
[58] Field of Search ............................ 119/15, 17, 19; 229/125.17, 125.36; 206/439

[56] References Cited

U.S. PATENT DOCUMENTS

| | | | |
|---|---|---|---|
| 1,627,048 | 5/1927 | Moore | 229/125.17 X |
| 1,758,917 | 5/1930 | Brooks | 229/125.17 X |
| 2,026,417 | 12/1935 | Conway et al. | 119/19 |
| 2,707,588 | 5/1955 | Amberg | 229/125.17 X |
| 2,990,948 | 7/1961 | Zackheim | 206/439 |
| 3,413,958 | 12/1968 | Artig | 119/15 |
| 3,437,257 | 4/1969 | Bua | 229/125.17 X |
| 3,507,441 | 4/1970 | Wilcox et al. | 119/19 |
| 4,337,116 | 6/1982 | Foster et al. | 162/158 |

FOREIGN PATENT DOCUMENTS

| | | | |
|---|---|---|---|
| 617344 | 2/1961 | Italy | 119/19 |
| 866442 | 4/1961 | United Kingdom | 119/19 |

Primary Examiner—Paul J. Hirsch
Attorney, Agent, or Firm—Senniger, Powers, Leavitt and Roedel

[57] ABSTRACT

The invention is directed to an isolating container for live animals comprising a container body and a closure therefor. The container body has an aperture therein for introduction and removal of animals and the said closure is attached to the container body to close the aperture. The body and the closure define an envelope which totally encloses the interior space within the container when the closure is attached to the body. The envelope comprises a fibrous mat permeable to air and carbon dioxide but impervious to microorganisms so that oxygen may pass into said interior and exhalation gases may pass out of said interior through the mat without passage of microorganisms into or out of said interior. The mat having an apparent density of between about 0.200 g/cm$^3$ and about 0.400 g/cm$^3$, and an air permeability of between about 45 and about 200. The mat comprises cellulosic fibers having an average length of between about 0.52 mm. and about 0.72 mm., and an average width of between about 0.018 mm. and about 0.024 mm.

51 Claims, 3 Drawing Sheets

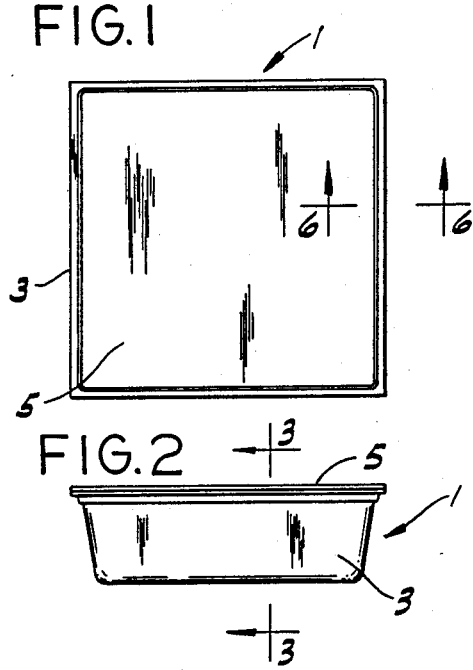
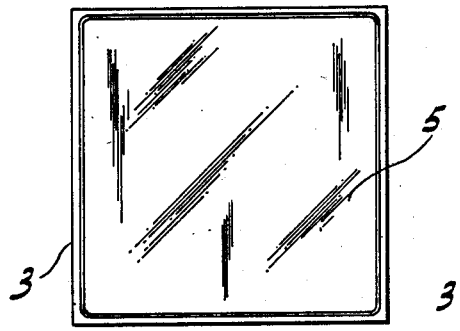
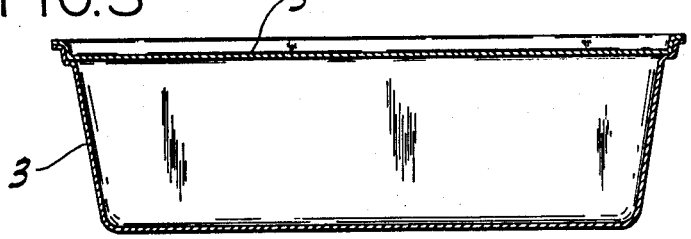
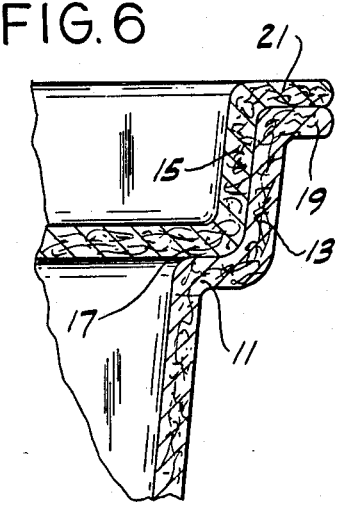
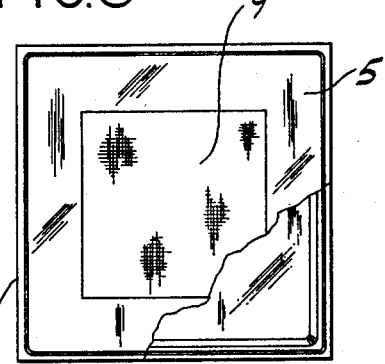

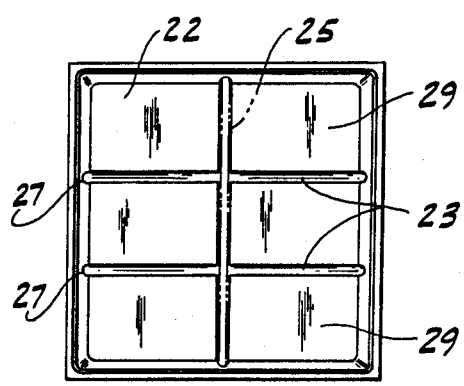
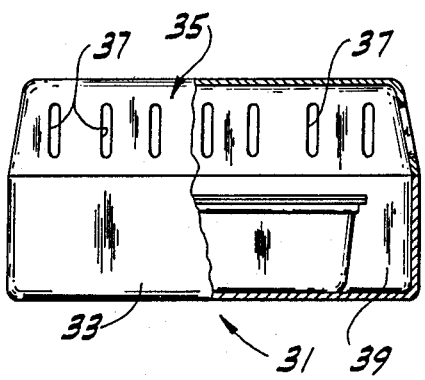
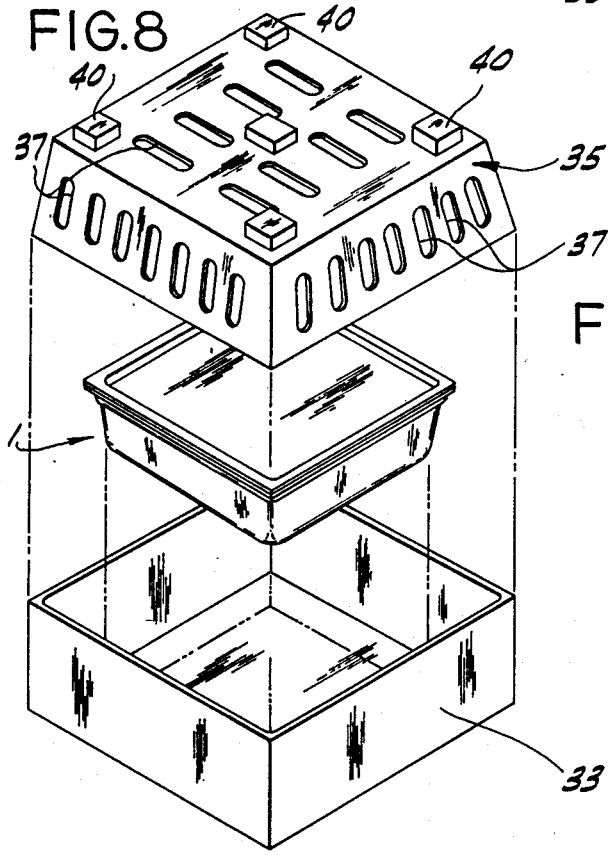
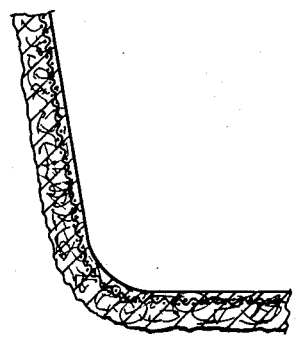

ISOLATING CONTAINER FOR LIVE ANIMALS

This application is a continuation-in-part of my co-pending application Ser. No. 021,221, filed Mar. 3, 1987.

BACKGROUND OF THE INVENTION

This invention relates to the housing and transportation of live animals, and more particularly to a novel container for live animals and method of transporting and housing the animals in the container, the container providing ventilation to the animals while serving as a barrier against transmission of microorganisms into or out of the container.

In the transportation of certain live animals there is a need for containers which provide adequate ventilation to allow the animals to breathe, but which provide a barrier against the transmission of germs or other microorganisms. For example, in the transportation of certain laboratory animals, it is important to prevent ingress of germs which may contaminate the animals and impair their usefulness for certain kinds of laboratory research. Prevention of the ingress of microorganisms is also important for protection of the health of a variety of animals. Prevention of the egress of microorganisms is important to protect the health of those handling live animal containers during shipment or otherwise. For certain animals, such as chickens, turkeys, and other poultry, pigeons, doves, canaries, budgerigars, parrots and other psittacine birds, shipment through the mail has heretofore been prohibited because of the risk of infection of those handling the containers.

Shipment of animals may not only expose the animals to disease but also places them under stress. Thus, a need exists not only for containers which protect the animals against contamination but which also serve to minimize the stress experienced by the animals in the course of shipment or housing within a containment system.

Prior to the present invention a variety of containers have been available to animal keepers, breeders and experimenters who wish to hold, restrain, confine or transport animals in biosecure (germ-tight) isolation. Such containers are commonly constituted of non-gas-permeable material and have air vents cut in their sides or top walls. To provide a germ barrier while preserving ventilation, the air vents are covered with a permeable air filter medium sometimes supported on or sandwiched between protective screening material. To prevent microorganisms from bypassing the filter medium, it has been common practice to apply adhesive tape both to the edges of the filter medium and to cover any cracks between the body of the container and the closure.

Trexler U.S. Pat. No. 3,238,922 discloses an axenic container for live animals having a closure in one end which includes a filter which is said to be impervious to microorganisms for admitting air to the interior. The filter is comprised of a porous or fibrous material such as fine glass wool; for example, three layers of Owens-Corning FM-003 fiberglass sandwiched between panels of fine mesh such as conventional metal, plastic or fiber glass window screen.

Schwarz U.S. Pat. No. 3,343,520 describes an animal cage filter cover constructed of a relatively thin sheet of air and gas pervious imperforate material of low structural strength. The sheet or mat of the filter cover is typically comprised of fiberglass and a thermoplastic organic resin such as polyvinyl chloride. The cover is sealed to the body of the cage through a sealing ring of complex cross-sectional configuration.

Lee et al. U.S. Pat. No. 3,528,227 discloses an animal cage having a cover composed entirely of fibrous web material adapted to withstand autoclaving. The fibrous web is constituted of synthetic resin filaments or fibers of polyester or the like, and a thermoplastic such as polyethylene. In a preferred embodiment, a particulate barrier material is sandwiched between two sheets of fibrous material. Despite having relatively large pores (as resulting, for example, from the use of polyester filaments of from 3 to 4 denier), the fibrous material is said to filter out microorganisms effectively by forcing air passing through the filter to follow a tortuous path and thereby reduce its transport velocity.

Lee et al. U.S. Pat. No. 3,613,639 and Lee U.S. Pat. No. 3,528,390 describe containers generally similar to that described in Lee et al. U.S. Pat. No. 3,528,227. In Lee et al. '639 the filter medium comprises a barrier layer of thermosetting resin such as melamine formaldehyde which coats the polyester fibers of the filter material.

Sedlacek U.S. Pat. No. 4,480,587 also describes a polyester fiber filter generally of the same type as that disclosed in the Lee patent. Closure is effected through use of a sealing ring.

SUMMARY OF THE INVENTION

Among the several objects of the present invention, therefore, may be noted the provision of a novel isolating container for housing or transporting live animals; the provision of such an isolating container which provides ventilation to the animals while serving as a barrier against ingress or egress of microorganisms; the provision of such an isolating container for which the degree or extent of ventilation can be controlled; the provision of such an isolating container comprising a filter medium which is self supporting; the provision of such an isolating container that is constructed from a filter medium which can be molded to essentially any desired shape to produce a self-supporting structure; the provision of such an isolating container having an effective seal between the container body and its closure; the provision of such an isolating container adapted for the shipment of diurnal birds such as pigeons, chickens, turkeys, ducks, game birds, canaries, budgerigars, parrots and other aviary birds; the provision of such an isolating container adapted for shipment of nocturnal animals such as rats, mice, and cavies; the provision of such a container adapted for shipment of other research animals, including non-human primates, rabbits, pigs, sheep, dogs, cats and other mammals; the provision of such an isolating container that can be used for mailing live animals; the provision of such an isolating container constructed to prevent animals (e.g., rodents) in the container from gnawing holes in the container and escaping therefrom; the provision of a container system for live animals which provides a germ barrier while assuring ventilation for the animals even when a number of containers are stacked on top of each other or packed together during handling, housing or shipment; the provision of a method for housing or transporting live animals and providing ventilation for them while preventing exposure of the animals to extraneous microorganisms or exposure of those responsible for transportation of the animals to organisms carried by the animals themselves; and the provision of a novel self-supporting filter medium adapted to provide ventilation to live animals while serving as a germ barrier.

Briefly, therefore, the present invention is directed to an isolating container for live animals comprising a container body and a closure therefor. The container body has an aperture therein for introduction and removal of the animals, the closure being adapted for attachment to the container body to close the aperture. The body and the closure define an envelope which totally encloses the interior space within the container when the closure is attached to the body. The envelope comprises means permeable to air and carbon dioxide but impervious to microorganisms so that oxygen may pass into the interior and exhalation gases may pass out of the interior through said means without passage of microorganisms into or out of the interior. The aforesaid means comprises a fibrous mat having apparent density between about 0.200 g/cm$^3$ and about 0.400 g/cm$^3$ and air permeability between about 45 and about 200, the mat being comprised of cellulosic fibers having an average length of between about 0.52 mm and about 0.72 mm and an average width of between about 0.018 mm and about 0.024 mm.

The invention is further directed to a container system for live animals. The system comprises an isolator adapted to confine the animals and an outer container adapted to contain the isolator. The isolator comprises an isolating container of the aforesaid type. The outer container comprises an outer container body and a closure therefor, the outer container body having an aperture therein for introduction and removal of the isolator. The outer container closure is adapted for attachment to the outer container body to close the aperture. The outer container body further comprises means for access of air to the isolator and egress of exhalation gases when the outer container is closed, so that animals contained within said outer container may breathe when the outer closure is attached to the outer container aperture. The relative dimensions of the outer container and the isolator are such as to provide a space between an inside wall of the outer container and the outside of the isolator so that ventilation of the isolator is assured.

The invention is further directed to a method for transporting or housing live animals. In this method the animals are placed in an isolating container comprising the container body and a closure therefor, and attaching the closure to the body that closes the aperture. The isolating container is as described above.

The invention is further directed to a filter medium comprising the fibrous mat having an apparent density of between about 0.200 g/cm$^3$ and about 0.400 g/cm$^3$, and an air permeability of between about 45 and about 200, said mat consisting essentially of cellulosic fibers having an average length of between about 0.52 mm. and about 0.72 mm. and an average width of between about 0.018 mm. and about 0.024 mm.

Further contemplated by the invention is a filter medium comprising a fibrous mat having an apparent density of between about 0.200 g/cm$^3$ and about 0.400 g/cm$^3$, and an air permeability of between about 45 and about 200, said mat comprising between about 90% and about 98% by weight of cellulosic fibers having an average length of between about 0.52 mm and about 0.72 mm and an average width of between about 0.018 mm and about 0.024 mm, and between about 2% and about 10% by weight of glass fibers, said glass fibers having an average diameter of between about 6 microns and about 16 microns, and an average length of between about 0.25 inch and about 1.0 inch.

Other objects and features will be in part apparent and in part pointed out hereinafter.

BRIEF DESCRIPTION OF THE DRAWINGS

FIG. 1 is a plan view of an isolating container of the invention;

FIG. 2 is a side elevation of the isolating container of FIG. 1;

FIG. 3 is a sectional view taken along the line 3—3 of FIG. 2;

FIG. 4 is a plan view similar to FIG. 1 but illustrating an isolating container with a lid of transparent or translucent material;

FIG. 5 is a plan view similar to FIG. 1 but illustrating a filter panel in the lid of the isolating container;

FIG. 6 is a detail view showing the mode of engagement of the lid to the body of the isolating container;

FIG. 7 is a plan view of the body of an isolating container of the invention illustrating grooves in the bottom and side walls thereof for receiving partitions;

FIG. 7A is an enlarged cross-sectional view of a portion of the body of the isolator illustrating an embodiment wherein wire mesh screen is embedded in the body;

FIG. 8 is a perspective view showing the isolating container placed within an outer container;

FIG. 9 is a view of the system of FIG. 8 with portions broken away to illustrate details;

Corresponding reference characters indicate corresponding parts in the several views of the drawings.

DESCRIPTION OF THE PREFERRED EMBODIMENTS

Figure 10:
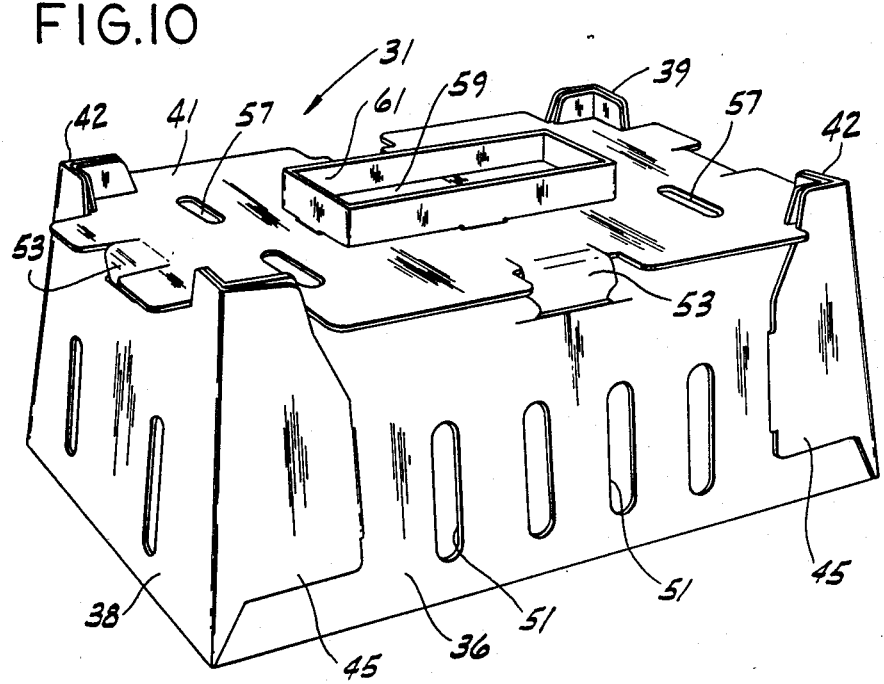
FIG. 10 is a perspective view illustrating, in assembled condition, an alternative construction of the outer container.

In accordance with the present invention, it has been discovered that certain self-supporting cellulosic fiber mat materials provide a highly effective barrier against passage of microorganisms, but are quite permeable to gases such as air, oxygen, and carbon dioxide. Surprisingly, it has been found that a cellulosic mat may be provided in a form which is permeable to such gases, yet substantial enough that a structure produced therefrom is not only self-supporting but also capable of bearing significant additional mechanical load. Based on this combination of properties, it has been determined that such fibrous mats can be advantageously employed as materials of construction for containers which may be used for the housing and/or transportation of animals. Such mat materials can be used not only as filter media for air and exhalation gases passing into and out of a container for isolating and transporting animals, but also as a material of construction for the container itself. Thus, the present invention provides a major improvement in the technology of transporting and housing animals without passage of microorganisms between the animals and the environment outside of the isolating container.

In one preferred embodiment of the invention, the entire container is constructed of the cellulosic fiber material, so that in effect the entire container constitutes a filter through which air and exhalation gases may pass, but which blocks the passage of germs and other microorganisms. It has been found that such a container is particularly advantageous for the transportation of diurnal birds such as pigeons, chickens, turkeys, ducks, game birds, canaries, budgerigars, parrots and other aviary birds. Moreover, it has been determined that such an isolating container can be used safely for transport of birds and mammals through the mail, a practice heretofore considered infeasible. Where the entire isolating container is constructed of the fibrous mat material, the interior of the container is completely dark, and this has been found to have a tranquilizing effect on birds which are adapted to remaining still when their environment is dark. By preventing the birds from experiencing the stress ordinarily associated with their confinement and shipping, the use of the isolating containers of the invention not only preserves the general physical condition of the birds, but also prevents specific problems typically encountered in conventional methods of shipping and handling. In particular, it has been found that birds which get excited in the dark often break their wings, an incapacitating injury that usually leads to their demise. As a result of the calming conditions induced by use of the isolating container of this invention, the incidence of wing breakage is minimized.

Construction of the entire isolating container from the fibrous mat material of the invention provides the further advantage of affording more than adequate ventilation for the animals contained within the isolator. Because substantially the entire isolator 1 of the present invention is made of the high-porosity fibrous mat described hereinabove, it will be understood that it provides overall ventilation superior to prior container systems. This is demonstrated by the following formula:

$$P \times A = V$$

where P is the porosity of the filter (air-permeable) material of the isolator, A is the area of such filter material and V is the resultant "ventilation factor" which is indicative of the overall ventilation of the isolator. Thus, for the isolator of the present invention, where a relatively large percentage (70-100%) of the surface area of the isolator is of filter material (e.g., the fibrous mat described hereinabove), the overall ventilation factor V is higher than that of conventional systems, even though the porosity of the filter material may be somewhat lower than the filter material (e.g., fiberglass) used in prior systems. This is because in such prior systems, the filter material represents only a relatively small fraction (e.g., 10-20%) of the overall area of the system.

In various alternative embodiments of the invention, the fibrous mat material is used as a filter medium in a container having a wall or cover comprising a transparent or translucent material to allow the transmission of light from the outside to the interior of the container. Such a container may be preferred for the housing or shipment of nocturnal animals, such as rats, which tend to be less active in a lighted environment.

The fibrous mat material is comprised of cellulosic fibers and is formed, for example, by preparing a pulp comprising a suspension of the fiber material in water and applying the pulp to a screen having the configuration of the mat to be produced. Simultaneously, a vacuum is drawn on the side of the screen opposite from that to which the pulp is applied. Such methods are used, for example, in the manufacture of fibrous products such as mache floral pots and the like. The fibrous mat material so produced has an apparent density of between about 0.200 g/cm$^3$ and about 0.400 g/cm$^3$, and an air permeability of between about 45 and about 200 as measured by a Bendix Sheffield Variable Air Porosimeter (sold by Bendix Automation and Measurement Division, Dayton, Ohio), having a 0.375 inch diameter aperture and operating on an input pressure equivalent to 0.50 inch water. The cellulosic fibers used in preparation of the mat are preferably relatively long with an average length of between about 0.52 mm. and about 0.72 mm., and a preferred average length of about 0.625 mm. The actual lengths of individual fibers preferably vary over a range of from less than 0.20 mm. to about 6.58 mm. If the numerical distribution of fibers within this range is weighted according to length of fiber (that is, if the percentage of fibers of a particular length is multiplied times the length of the fiber) a "weighted average" of fiber may be obtained. This "weighted average" is preferably from about 1.03 mm. to about 1.71 mm., with a preference of about 1.39 mm. The fibers are preferably narrow with an average width of between about 0.018 mm. and about 0.024 mm., and preferably about 0.019 mm., with less than about 20% (and preferably less than about 5%) of the fibers having a width greater than 0.036 mm. The fact that the fibers are relatively long is advantageous in that this contributes to the overall strength of the mat and thus of the container. The fact that the fibers are narrow is further advantageous in that this improves particle collection efficiency for more efficient air filtration, especially with respect to particles in the sub-micron range.

More particularly, it is preferred that the filter medium of the invention have a particle collection efficiency equivalent to the minimum (99.97%) established for HEPA filters when subjected to the standard DOP test described in ASTM D2986. In this test, particle collection efficiency is determined at a face velocity of 1 ft/min for particles of the most penetrating size (0.3 microns) and the measured results are extrapolated to the most severe conditions anticipated in service, e.g., shipment on an aircraft which climbs from sea level to an altitude of 40,000 ft. in 30 minutes.

The fibrous mat filter medium of the invention should be substantially free from asphaltic binder materials, and in this respect differs significantly from such products as the fibrous materials of nursery pots. The latter materials normally include asphaltic binders for water repellancy, but such binders are disadvantageous in the containers of the invention because of the adverse effect of the binders on permeability of the container walls and lid.

In one preferred form, the fibrous mat material consists essentially of cellulosic fibers of the above described type. This form of mat material has substantial strength, and is thus a superior material for the fabrication of a self supporting container. In another advantageous embodiment, the fibrous material contains between about 90% and about 98% by weight of cellulosic fibers and between about 2% and about 10% by weight of glass fibers, the glass fibers having an average length of between about 0.25 inch and about 1.0 inch and an average diameter of between about 6 microns and about 16 microns. This second material exhibits superior permeability to respiration gases, for example, in the range of between about 30% greater permeability and about 230% greater permeability, but has somewhat less structural strength and durability than the material which consists essentially of the cellulosic fibers. The second material is primarily adapted for use in special applications which require relatively high gas permeability. For example, the use of the more permeable material may be indicated for relatively large animals whose respiratory demands are greater than those of small animals, for use in hot weather to provide higher rates of ventilation to avoid excessive interior heat buildup, or for certain animals which are prone to hyperventilation after periods of excitement, which may be caused by movement or jostling of the container.

In any case, the mat material preferably has a thickness of between about 0.09 and about 0.8 inch, more preferably between about 0.1 and about 0.4 inch. Such thickness provides an optimal combination of structural stability, air permeability and resistance to germ transmission.

In a particularly preferred method for preparation of the fibrous mat filter medium of the invention, a pulp is produced from cellulosic fibers derived from a conifer, including southern pine species of wood, such as short leaf, long leaf, slash, loblolly or pitch pine. The pulp is advantageously produced using conventional equipment well known to the art, such as, for example, a "Hydrapulper" or "Beater". The slurry preferably has a consistency of between about 3% and about 12% by weight, including cellulosic fibers and any glass fibers that may be included in the pulp. The pulp is then subjected to mechanical refining (beating) in order to separate the fibers, fibrillate the fiber surfaces, and internally plasticize the fiber walls with water, thereby enhancing the bonding potential of the fibers. However, the extent of refining is minimized in order to preserve the high permeability and bulk of the fibrous mat produced.

Advantageously, the pulp may be produced from recycled boxboard or paper stock, which was previously manufactured by the sulfate ("kraft") process. Paper drinking cup stock yields "kraft" fiber of particularly desirable properties. Where cup stock is used, the pulp may further comprise a minor weight portion of unprinted newsprint, typically 15-30% by weight. The use of "kraft" fibers in the present invention is preferred to increase the strength of the mat.

After the pulp has been refined as described above, a shaped product, such as the body or closure of the isolator, is produced by a forming or molding process. The mold used in the process is generally basket shaped. The outside of the mold, on which the mat is formed, comprises a wire screen. A nozzle is provided in the mold for attachment of a vacuum hose. To initiate the molding process, the vacuum hose is attached, the mold is immersed in the pulp slurry, and a vacuum is applied via the hose. The resultant pressure differential causes pulp fibers to be deposited on the outside surface of the mold. After the mat has built up to the desired thickness on the outside of the mold, the mold is removed from the slurry, and the bulk of the excess water is removed from the mat by continued application of vacuum and gravity drainage. Once the bulk of the free water has been removed, the pressure differential is reversed and the shaped mat is blown off the mold. The molded product is then dried in an oven using hot air which is circulated around the shaped product. Drying is carried out at a relatively low, controlled rate so as not to cause splitting (i.e., internal rupture), scorching or warping of the mat material. Substantial drying periods of, for example, 1 to 3 hours, are advantageously used to facilitate diffusion of water vapor through the partially dried outer regions of the fibrous mat.

In a commercial operation, a conveyor may be used to carry the shaped mat articles through a drying area. As the mold is removed from the slurry, it may be suspended over the conveyor and allowed to drain. Thereafter, the shaped mat is blown off the mold and onto the conveyor, which carries it through the oven. Drying is normally carried out at a temperature of 150°–300° F.

After drying, the mat forming the shaped container is severely "two-sided", meaning that the inside and outside faces of the container walls differ considerably in roughness. Thus, the inside surfaces of the container have a relatively smooth texture received from the wire screen against which they were drawn during the molding process, while the outside faces of the walls are extremely rough due to the varied buildup of clumps of fibers. Because of this extreme roughness, the caliper or thickness of the mat varies over a wide range, preferably from about 0.100 inch to about 0.400 inch, with the preferred average caliper being about 0.250 inch.

The density of the mat is generally low and will also vary from location to location depending on a number of factors, including the materials used, the size and shape of the mold, the thickness of the mat, and the degree of vacuum drawn by the vacuum pump. Preferably, the apparent density of the mat should be between about 0.200 g/cm$^3$ and 0.400 g/cm$^3$. Because the density of the mat is relatively low, its bulk (which is the inverse of density) is correspondingly high.

The air permeability of the mat also varies widely over the surface of the mat. This is due to the vacuum molding process, wherein the pulp tends to gather on the mold in clumps, rather than uniformly as in conventional paper-making processes. This lack of uniformity contributes to the utility of the present invention in that the concentrations of fibers create a structural network or lattice which gives the mat both unusual strength and high air permeability, the former of which permits use of the mat alone, without auxiliary supporting parts, to perform the function of a container (i.e., to be not only self-supporting but to support significant additional bearing load) and the latter of which is conducive to natural ventilation.

The porosity of the mat (which is the fraction of the volume of the mat represented by void) is also high. As calculated using the following formula $$\text{Porosity} = \left(1 - \frac{\text{density of mat}}{\text{density of fiber}}\right)$$

and using a fiber density of 1.55 gr/cm$^3$ (the density of cellulose), the porosity of the mat is preferably between about 0.75 and about 0.85, with the preferred average being about 0.80. This compares to about 0.87, 0.65 and 0.13 for filter paper, printing paper and glassine paper, respectively.

The vacuum molding process used to make the present invention produces a random distribution of the fibers in the mat in the sense that the fibers are not generally aligned in one direction. This contrasts with conventional paper making processes where the fibers tend to align in "machine direction", causing a marked "grain" in the mat. The absence of a specific grain direction in the mat of the present invention is believed to result in greater edge-compression resistance and more efficient particle collection.

It will also be noted that since there is no squeezing (as by the use of rollers) of the fibers during the vacuum molding process of the present invention, the fibers are bonded over only a relatively small percent of their lengths (e.g., about 50 percent) compared to the fibers in conventional cellulosic mats, where the fibers are typically found bonding with other fibers over approximately 95 percent of their lengths. The relatively low level of bonding of the fibers in the mat of this invention contributes to high bulk, low density, high porosity and high air permeability.

The fibrous mat material of the invention has been found to exhibit substantial resistance to penetration by water. This is believed to be due to the distribution of long narrow fibers arranged so closely along the surface of the mat that the natural surface tension of the water is not broken sufficiently to allow penetration. For example, when water at a depth of 0.5 inch is allowed to stand inside a container formed of the fibrous mat filter medium of the invention, the water does not penetrate to the outside bottom surface of the container within four days. While remaining substantially water repellent and serving as a barrier to microorganisms, including viruses, the filter medium exhibits exceptional transmission properties with respect to respiration gases. With respect to the $CO_2$ content of exhalation gases, it is believed that transmission by gas diffusion may be augmented by chemical reaction with the residual moisture content of the material. Thus, at points near the inside surface of the container, the $CO_2$ condenses with water to form carbonic acid:

$$H_2O + CO_2 \rightarrow H_2CO_3$$

The carbonic acid diffuses to the outer surface of the medium where the reverse process takes place, resulting in the expulsion of $CO_2$:

$$H_2CO_3 \rightarrow H_2O + CO_2$$

The fibrous mat material as described above is also capable of being sterilized by any standard method of autoclaving. This is important because all containers for shipping or holding axenic (germ-free) animals must be sterilized. The most common method of sterilizing is by steam under pressure (250° F. at 2 atmospheres for 30 minutes) followed by a period of vacuum drying in a sterile chamber. This process causes many types of conventional animal containers to deteriorate and degrade to a point where they are unsuitable for further use. The mat of the present invention, on the other hand, retains its original molded shape, thus preserving the integrity of the container for further use. Gas (ethylene oxide) autoclaving may also be used without adversely affecting the fibrous mat material.

Referring now to the drawings, FIGS. 1 and 2 illustrate an isolating container 1 having a body comprising a basket 3 and a closure comprising a lid 5. The open top of the basket comprises an aperture through which the animals may be introduced and removed. With the closure attached to the body as illustrated in FIGS. 1 and 2, the lid and basket define an envelope which totally encloses the interior of the container. This envelope comprises a fibrous mat material which constitutes means permeable to air and carbon dioxide but impervious to microorganisms, so that oxygen may pass into the interior and exhalation gases may pass out of the interior through such means without passage of germs or other microorganisms into or out of the interior.

In the embodiment of FIGS. 1 and 2, both the lid and basket are constructed entirely of a self supporting fibrous mat material of such type. Thus, a container for the animals, a conduit for respiration gases, and a barrier against germ transmission are all provided without the need for incorporation of a separate filter pad in the lid or any wall of the basket. Normally and preferably, the fibrous material is opaque, so that in this embodiment the containment envelope is entirely opaque when the lid is attached to the basket. An isolating container of this type has been found to be uniquely advantageous for the transportation of live animals such as diurnal birds which are tranquilized by the substantially complete darkness which consequently prevails in the interior of the container when the opaque lid is in place. It has been found that pigeons, for example, can be shipped overnight in such opaque containers and, when removed from the isolating container, show no significant weight loss, accelerated respiration or other symptoms of stress. Moreover, it has been found that pigeons confined in the isolation of the invention, without water or food for as long as three days, experience less weight loss than pigeons confined for the same period without water or food in a conventional container that has ports for passage of light and air.

FIG. 4 illustrates an alternative embodiment of the invention in which the lid 3 is constituted of transparent or translucent material so that the interior of the container may receive light from outside the container. The entire basket is constructed of the fibrous mat material which serves as both conduit for respiration gases and barrier against germ transmission. The embodiment of FIG. 4 is advantageous in the case of nocturnal animals such as rats, mice and cavies which are less active in a lighted environment.

FIG. 5 illustrates an embodiment of the invention in which the means in the envelope pervious to respiration gases comprises a filter 9 constituted of the aforesaid fibrous mat material. As shown the filter is located in the lid, but it will be understood that the filter could also be located on a wall of the basket. In this instance the body and mating portions of the lid are constructed of a nonpervious material such as, for example, molded plastic. The embodiment of FIG. 5 may be constructed of completely opaque materials so as to provide substantial darkness in the interior, or may be so constructed as to provide for light transmission. In the latter case, light transmission may be provided by a translucent panel or transparent window in the lid or basket. Alternatively, the entire isolating container except the fibrous mat filter may be comprised of translucent or transparent plastic material.

FIG. 3, which is a sectional view along the line 3—3 of FIG. 2, and FIG. 6, which is an enlarged sectional view along the line 6—6 of FIG. 1, both illustrate a preferred means for secure attachment of the lid to the basket. As particularly indicated in FIG. 6, the basket has a generally horizontal flange 11 extending around the upper rim thereof, and a second flange 13 integral with flange 11 and extending upwardly and outwardly from the horizontal flange. The lid has a flange 15 extending upwardly and outwardly from the periphery of the lid, flange 15 being adapted to nest within flange 13 and engage the inside face of flanges 11 and 13 in closing the container.

As further shown in FIGS. 3 and 6, the bottom surface of the lid is substantially flat and generally horizontal in a region 17 extending inwardly from the lid flange 15. Flange 13 has a lip 19 extending laterally outwardly from the upper end thereof, and flange 15 has a similar lip 21 extending laterally outwardly from its upper end. The relative dimensions and orientations of flanges 13 and 15 are such that in closing of the container the bottom horizontal surface of the lid may be brought into engagement with the upper surface of the horizontal flange 11, while the lower surface of the lip 21 on lid flange 15 is simultaneously brought into engagement with the upper surface of the lip 19 on flange 13. This provides a snug fit and secure closure of the container. Preferably the width of the band of contact between the lid and basket is at least 1.0 inch along the path between the exterior and interior of the isolator, that is, from the outside limit of the line of contact between lips 21 and 19 to the inside limit of the line of contact between flange 11 and region 17.

In order further to promote secure closure, lid flange 15 is preferably bowed outwardly for an interference fit with the upwardly and outwardly extending flange 13 on the basket. In this embodiment, as shown, the basket is substantially rectangular in horizontal cross section. Most preferably, in a container of a size that can be readily handled by a single individual handler, each of the four sides of the lid flange 15 is bowed or tapered upwardly and outwardly by between about 0.1 and about 0.3 inches to provide the interference fit. This provides a particularly tight engagement between the lid and the basket when the flanges are brought into contact in closing the container.

In a further preferred embodiment of the invention, as illustrated in FIG. 7, the basket comprises a substantially planar and horizontal bottom wall 22, the bottom wall having grooves 23 therein which are adapted to receive the lower edges of vertical partitions 25 for dividing the basket into separate compartments. Complementary grooves 27 are provided in the side walls of the basket. These are oriented to receive the side edges of the vertical partitions. Thus, a plurality of individual animals may be transported in a single container while keeping the animals isolated one from another so as both to minimize stress on the animals and maximize stability in handling of the container. Moreover, in the embodiment illustrated in FIG. 7, the layout of the partitions provides that each compartment 29 defined by the partitions is bounded by a portion of the isolator envelope sufficient to provide more than adequate ventilation for the animal confined in such compartment.

FIG. 7A illustrates another feature of the present invention wherein a wire mesh screen 30 is embedded in the body and closure of the isolator 1. This feature is preferred for transport of animals such as rodents to prevent gnawing or clawing through the walls of the isolator. The wire mesh may be embedded in the walls of the container during the vacuum molding process.

Security of the isolating container, and of the animals contained therein, is further promoted by the container system of the invention that is illustrated in FIGS. 8 and 9. This system comprises an isolator 1 of the type described above, and an outer container generally designated 31 adapted to contain the isolator. The outer container comprises an outer container body 33 and a closure for the body 33, the closure comprising a lid 35. When the closure is taken off, the open top of the body 33 comprises an aperture through which the isolator may be introduced and removed. The outer container further comprises means, such as holes 37 in the body and the lid, which allow inflow and outflow of gases so that animals contained within the system can breathe when the outer container is closed by attachment of the lid. As particularly shown in FIG. 9, the relative dimensions of the outer container and the isolator are such as to provide a space 39 between the inside wall of the outer container and the outside of the isolating envelope whereby ventilation of the isolator is assured. FIG. 8 further shows spacing blocks 40 integrally molded in lid 35 so that a plurality of the container systems can be stacked without blocking the ventilation holes 37 in the top of the outer container lid.

Figure 11:
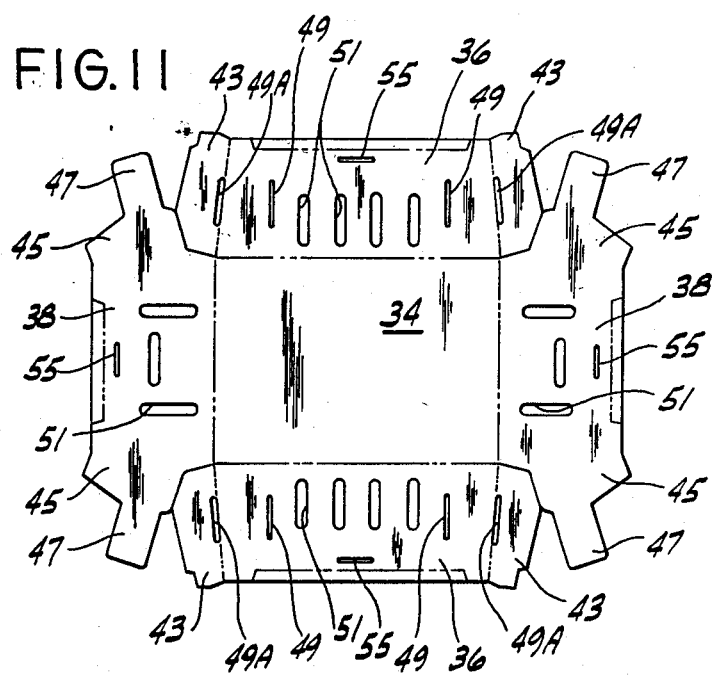
FIG. 11 is a blank of boxboard material from which the body of the outer container of FIG. 10 may be assembled.

FIGS. 10 and 11 illustrate a preferred construction of the outer container 31. Thus, as show, the outer container is of substantially rigid material (e.g., boxboard) and generally of rectangular shape, having a bottom 34, two side walls each designated 36 and two end walls, each designated 38. The four walls slope slightly inwardly and upwardly from the bottom and, as indicated at 42, each corner of the container extends upwardly a relatively short distance (e.g., 1 inch) above the top of the container to permit stacking of several containers with the bottom 34 of an upper container spaced above the top of the container therebelow, as will be discussed further hereinafter. The container also includes a closure or lid 41 which, when removed, enables the isolator 1 to be placed in and removed from the container through the open top of the container.

The outer container is preferably of knockdown construction, as shown in FIG. 11, with the side walls 36 having end flaps 43 adapted to fold flat against the inside surfaces of the end walls 38, and with the end walls having end flaps 45 adapted to fold flat against the outside surfaces of the side walls and tabs 47 receivable in vertical slots 49 in the side walls and lockable in slots 49A, to secure the side and end walls in upright and assembled position. The side and end walls of the container have ventilation openings 51 therein of suitable size and shape.

The lid 41 of the container comprises a flat generally rectangular panel of suitable sheet material (e.g., boxboard) having side margins which project outwardly beyond the end and side walls of the container between the corner extensions 42. Portions of these side margins are formed to be bent down to provide tabs 53 (one at each side of the lid) receivable in horizontal slots 55 in respective side and end walls of the container to fasten the lid to the container. The lid also has suitable ventilation openings 57 therein, although the center portion of the lid is free of openings to provide an appropriate size space for the attachment of an address label 59.

As noted above, several outer containers 31 may be stacked one on top of another, with the bottom of one container resting on the corner extensions 42 of the container therebelow to provide a ventilation space between the containers so that animals within isolators 1 in the outer containers may readily breath when the lids 41 are secured in place. To provide additional support for stacking, the lid 41 of each container has a support structure on its top surface in the form of a generally rectangular support member 61 surrounding the central portion of the lid having the address label 59 secured thereto. Support member 61 extends up from the lid approximately the same distance as the corner extensions 42 (e.g., 1 inch), so that the tops of the support member and the corner extensions lie generally in the same horizontal plane to provide support for a container stacked thereon not only at the corners of the container but at the center thereof. The support structure also functions to protect the address label 59 from abrasion, etc. during shipment and handling.

A container system comprising an outer container 31 as shown in FIG. 10 and an isolater 1 having partitions 25 therein is capable of supporting a vertical load of 1,560 pounds with a total vertical deflection of only 1.80 inch. This represents a significant improvement over prior animal containers (which typically can bear a load of only about 500–700 pounds before collapsing) and should provide more than adequate protection for animals within the isolator 1 in the event heavy cargo is placed on the container system.

In accordance with the method of the invention, live animals are housed and/or transported by placing them in the body of an isolating container 1 of the type described above, and thereafter attaching the closure to the body. If necessary, as when animals are being transported by public carrier, the isolating container 1 is placed within an outer container 31 of the type further described above, which has means for access and egress of respiration gases so that animals inside the container system can breathe when the outer container is closed.

In view of the above, it will be seen that the several objects of the invention are achieved and other advantageous results attained.

As various changes could be made in the above methods and products without departing from the scope of the invention, it is intended that all matter contained in the above description or shown in the accompanying drawings shall be interpreted as illustrative and not in a limiting sense.

What is claimed is:

1. An isolating container for live animals comprising a container body and a closure therefor, said container body having an aperture therein for introduction and removal of animals, said closure being adapted for attachment to the container body to close the aperture, said body and said closure defining an envelope which totally encloses the interior space within the container when the closure is attached to the body, said envelope comprising means permeable to air and carbon dioxide but impervious to microorganisms so that oxygen may pass into said interior and exhalation gases may pass out of said interior through said means without passage of microorganisms into or out of said interior, said air-permeable means comprising a fibrous mat having an apparent density of between about 0.200 g/cm$^3$ and about 0.400 g/cm$^3$ and an air permeability of between about 45 and about 200, said mat comprising cellulosic fibers having an average length of between about 0.52 mm. and about 0.72 mm., and an average width of between about 0.018 mm. and about 0.024 mm.

2. An isolating container as set forth in claim 1 wherein said air-permeable means consists essentially of said cellulosic fibers.

3. An isolating container as set forth in claim 1 wherein said air-permeable means comprises between about 90% and about 98% by weight of said cellulosic fibers and between about 2% and about 10% by weight of glass fibers, said glass fibers having an average diameter of between about 6 microns and about 16 microns, and an average length of between about 0.25 inch and about 1.0 inch.

4. An isolating container as set forth in claim 1 wherein said envelope is entirely opaque whereby the interior of the envelope is substantially dark when said closure is attached to said body.

5. An isolating container as set forth in claim 1 wherein said envelope is constituted substantially entirely of said fibrous mat.

6. An isolating container as set forth in claim 1 wherein said body comprises a basket and said closure comprises a lid for said basket.

7. An isolating container as set forth in claim 6 wherein said lid is constituted substantially entirely of said fibrous mat.

8. An isolating container as set forth in claim 6 wherein said basket is constituted substantially entirely of said fibrous mat.

9. An isolating container as set forth in claim 6 wherein said lid comprises a transparent or translucent material so that the interior of said container receives light from outside the container.

10. An isolating container as set forth in claim 6 wherein said basket has a generally horizontal flange extending around the upper rim thereof, and a second flange integral with said generally horizontal flange extending upwardly and outwardly from said horizontal flange, said lid having a flange extending upwardly and outwardly therefrom at its periphery, said lid flange being adapted to nest within said second flange of the basket and engage the inside face of said second flange in closing said isolating container.

11. An isolating container as set forth in claim 10 wherein said lid flange is bowed outwardly for an interference fit with said second flange of the basket, thereby providing a tight fit between said lid and said basket when said flanges are brought into engagement in closing of said container.

12. An isolating container as set forth in claim 11 wherein said basket is substantially rectangular in horizontal cross-section, and each of the four sides of said lid flange is bowed outwardly by between about 0.1 and about 0.3 inches to provide said interference fit.

13. An isolating container as set forth in claim 11 wherein the bottom surface of said lid is substantially flat and generally horizontal in a region extending inwardly from said lid flange, each of said lid flange and said second flange of the basket having a lip extending laterally outwardly from the upper end thereof, and the relative dimensions and orientations of said flanges being such that in closing of said container the bottom horizontal surface of said lid is adapted to be brought into engagement with the upper surface of said horizontal flange of the basket while the lower surface of the lip on said lid flange is simultaneously brought into engagement with the upper surface of the lip on said second flange of the basket.

14. An isolating container as set forth in claim 6 wherein said basket comprises a substantially horizontal bottom wall, said bottom wall having grooves therein adapted to receive the lower edges of partitions for dividing said basket into separate compartments.

15. An isolating container as set forth in claim 14 wherein said basket further comprises a side wall, said side wall having grooves therein oriented to receive the side edges of said partitions.

16. An isolating container as set forth in claim 6 wherein said basket comprises side walls which taper upwardly and outwardly from the bottom of the basket whereby a plurality of said baskets can be nested for convenient storage thereof.

17. An isolating container as set forth in claim 1 wherein the thickness of said fibrous mat is between about 0.09 and about 0.80 inch.

18. An isolating container as set forth in claim 1 wherein said container body has a wire mesh screen embedded therein.

19. An isolating container as set forth in claim 1 wherein said fibrous mat is produced by the steps of:
preparing a pulp comprising a suspension of said cellulosic fiber material in water;
applying said pulp to a screen having the configuration of the mat to be produced; and
drawing a vacuum on the side of the screen opposite from that to which the pulp is applied.

20. A container system for live animals, said system comprising an isolator adapted to receive the animals and an outer container adapted to contain the isolator,
said isolator comprising an isolator body and a closure therefor, said isolator body having an aperture therein for introduction and removal of animals, said closure being adapted for attachment to the isolator body to close the aperture, said body and said closure defining an envelope which totally encloses the interior space within the isolator when the closure is attached to the body, said envelope comprising means permeable to air and carbon dioxide but impervious to microorganisms so that oxygen may pass into said interior and exhalation gases may pass out of said interior through said air-permeable means without passage of microorganisms into or out of said interior, said air-permeable means comprising a fibrous mat having an apparent density of between about 0.200 g/cm$^3$ and about 0.400 g/cm$^3$, and an air permeability of between about 45 and about 200, said mat comprising cellulosic fibers having an average length of between about 0.52 mm. and about 0.72 mm. and an average width of between about 0.018 mm. and about 0.024 mm.
said outer container comprising an outer container body and a closure therefor, said outer container body having an aperture therein for introduction and removal of said isolator, said outer container closure being adapted for attachment to the outer container body to close the outer container body aperture, said outer container further comprising means for inflow of air and outflow of exhalation gases when the outer container is closed, so that animals contained within said system may breathe when said said outer container closure is attached to said outer container body, the relative shape and dimensions of said outer container and said isolator being such as to provide a space between an inside wall of the outer container and the outside of said envelope whereby ventilation of said isolator is assured.

21. A container system as set forth in claim 20 wherein said air permeable means of said envelope consists essentially of said cellulosic fibers.

22. A container system as set forth in claim 20 wherein said air permeable means of said envelope comprises between about 90% and about 98% by weight of said cellulosic fibers and between about 2% and about 10% by weight of glass fibers, said glass fibers having an average diameter of between about 6 microns and about 16 microns and an average length of between about 0.25 inch and about 1.0 inch.

23. A container system as set forth in claim 20 wherein said envelope is substantially entirely opaque whereby the interior of said isolator is substantially dark when said isolator closure is attached to said isolator body.

24. A container system as set forth in claim 23 wherein said envelope is constituted substantially entirely of said fibrous mat.

25. A container system as set forth in claim 20 wherein said isolator body comprises a basket and said closure comprises a lid for said basket.

26. A container system as set forth in claim 25 wherein said lid is constituted substantially entirely of said mat.

27. A container system as set forth in claim 26 wherein said basket is constituted substantially entirely of said fibrous mat.

28. A container system as set forth in claim 25 wherein said lid comprises a transparent or translucent material and said outer container comprises means for access of light so that the interior of said isolator receives light from outside said container system.

29. A container system as set forth in claim 25 wherein said basket has a generally horizontal flange extending around the upper rim thereof, and a second flange integral with said generally horizontal flange extending outwardly from said horizontal flange, said lid having a flange extending upwardly and outwardly therefrom at its periphery, said lid flange being adapted to nest within said second flange of the basket and engage the inside face of said second flange in closing said isolator.

30. A container system as set forth in claim 29 wherein said lid flange is bowed outwardly for an interference fit with said second flange of the basket, thereby providing a tight fit between said lid and said basket when said flanges are brought into engagement in closing of said container.

31. A container system as set forth in claim 30 wherein said basket is substantially rectangular in horizontal cross-section and each of the four sides of said lid flange is bowed outwardly by between about 0.1 and about 0.3 inches to provide said interference fit.

32. A container system as set forth in claim 30 wherein the bottom surface of said lid is substantially flat and generally horizontal in a region extending inwardly from said lid flange, each of said lid flange and said second flange of the basket having a lip extending laterally outwardly from the upper end thereof, the relative dimensions and orientations of said flanges being such that in closing of said container the bottom surface of said lid is adapted to be brought into engagement with the upper surface of said horizontal flange of the basket while the lower surface of the lip on said lid flange is simultaneously brought into engagement with the upper surface of the lip on said second flange of the basekt.

33. A container system as set forth in claim 25 wherein said basket comprises a substantially horizontal bottom wall, said bottom wall having grooves therein adapted to receive the lower edges of partitions for dividing said basket into separate compartments.

34. A container system as set forth in claim 33 wherein said basket further comprises a side wall, said side wall having grooves therein oriented to receive the side edges of said partitions.

35. A container system as set forth in claim 25 wherein said basket comprises side walls that which taper upwardly and outwardly from the bottom of the basket whereby a plurality of said baskets can be nested for convenient storage thereof.

36. A container system as set forth in claim 20 wherein the thickness of said fibrous mat is between about 0.09 and about 0.8 inch.

37. A container system as set forth in claim 20 wherein said isolator body has wire mesh screen embedded therein.

38. A method for transporting or housing live animals comprising:
placing the animals in an isolating container comprising a container body and a closure therefor, said container body having an aperture therein through which the animals are introduced, said closure being adapted for attachment to the container body to close the aperture, said body and said closure defining an envelope which totally encloses the interior space within the container when the closure is attached to the body, said envelope comprising means permeable to air and carbon dioxide but impervious to microorganisms so that oxygen may pass into said interior and exhalation gases may pass out of said interior through said air-permeable means without passage of microorganisms into or out of said interior, said air-permeable means comprising a fibrous mat having an apparent density of between about 0.200 g/cm$^3$ and about 0.400 g/cm$^3$ and an air permeability of between about 45 and about 200, said mat comprising cellulosic fibers having an average length of between about 0.52 mm. and about 0.72 mm. and an average width of between about 0.018 mm and about 0.024 mm.; and attaching said closure to said body to close said aperture.

39. A method as set forth in claim 38 wherein said air-permeable means consists essentially of said cellulosic fibers.

40. A method as set forth in claim 38 wherein said air-permeable means comprises between about 90% and about 98% by weight of said celluosic fibers and between about 2% and about 10% by weight of glass fibers said glass fibers having an average diameter of between about 6 microns and about 16 microns and an average length of between about 0.25 inch and about 1.0 inch.

41. A method as set forth in claim 38 wherein said envelope is substantially entirely opaque whereby the interior is substantially dark when said closure is attached to said body.

42. A method as set forth in claim 41 wherein diurnal birds are placed within said isolating container.

43. A method as set forth in claim 42 wherein pigeons are transported in said isolating container.

44. A method as set forth in claim 41 wherein said envelope is constituted substantially entirely of said fibrous mat.

45. A method as set forth in claim 38 wherein said body comprises a basket and said closure comprises a lid for the basket.

46. A method as set forth in claim 45 wherein said lid is constituted substantially entirely of said fibrous mat.

47. A method as set forth in claim 45 wherein said lid comprises a transparent or translucent material so that the interior of said container receives light from outside the container.

48. A method as set forth in claim 47 wherein rodents are placed within said container.

49. A method as set forth in claim 38 further comprising said isolating container within an outer container adapted to contain the isolator, and attaching an outer closure to the outer container, said outer container comprising means for access of air and egress of exhalation gases so that animals contained within said outer container may breathe when said outer closure is attached to said outer container, the relative shapes and dimensions of said outer container and said isolator being such as to provide a space between an inside wall of said outer container and an outer wall of said isolating container sufficient that ventilation of said isolating container is assured.

50. A filter medium comprising a fibrous mat having an apparent density of between about 0.200 g/cm$^3$ and about 0.400 g/cm$^3$ an air permeability of between about 45 and about 200, said mat consisting essentially of cellulosic fibers having an average length of between about 0.52 mm. and about 0.72 mm. and an average width of between about 0.018 mm. and about 0.024 mm.

51. A filter medium comprising a fibrous mat having an apparent density of between about 0.200 g/cm$^3$ and about 400 g/cm$^3$ an air permeability of between about 45 and about 200, said mat comprising between about 90% and about 98% by weight of cellulosic fibers having an average length of between about 0.52 mm. and about 0.72 mm. and an average width of between about 0.018 mm. and about 0.024 mm. and between about 2% and about 10% by weight of glass fibers, said glass fibers having an average diameter of between about 6 microns and about 16 microns and an average length of between about 0.25 inch and about 1.0 inch, said mat being substantially free of asphaltic binder material.

* * * * *